June 19, 1934.  E. S. JOHNSON  1,963,409
ELECTRIC TOASTER APPLIANCE
Filed Oct. 13, 1931  2 Sheets-Sheet 1
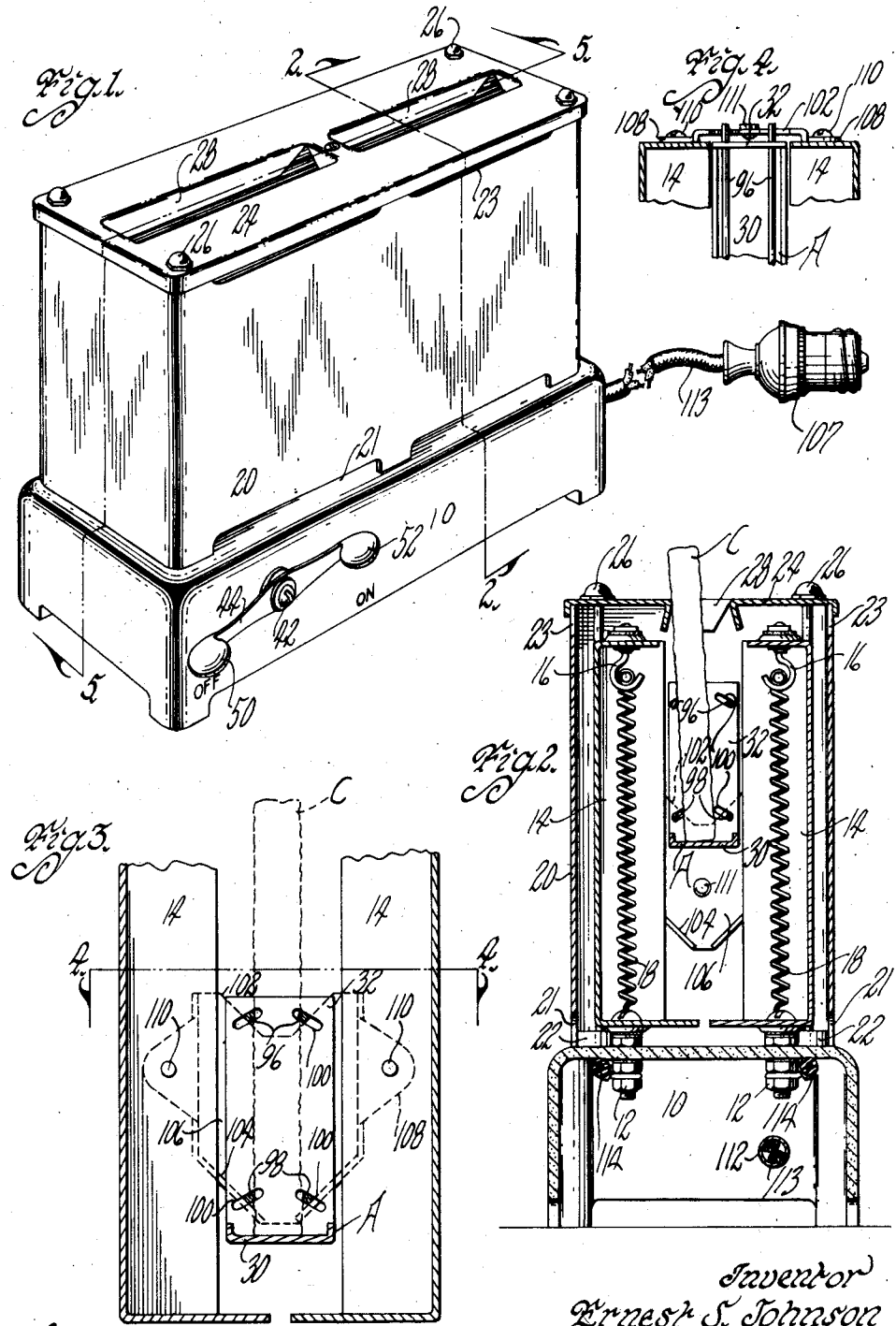

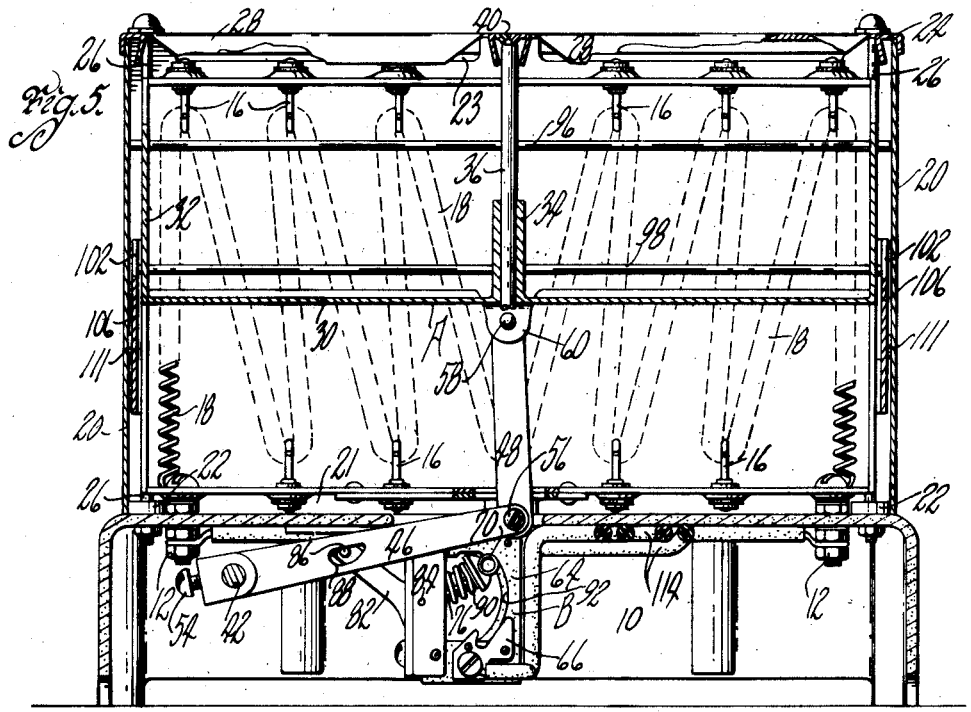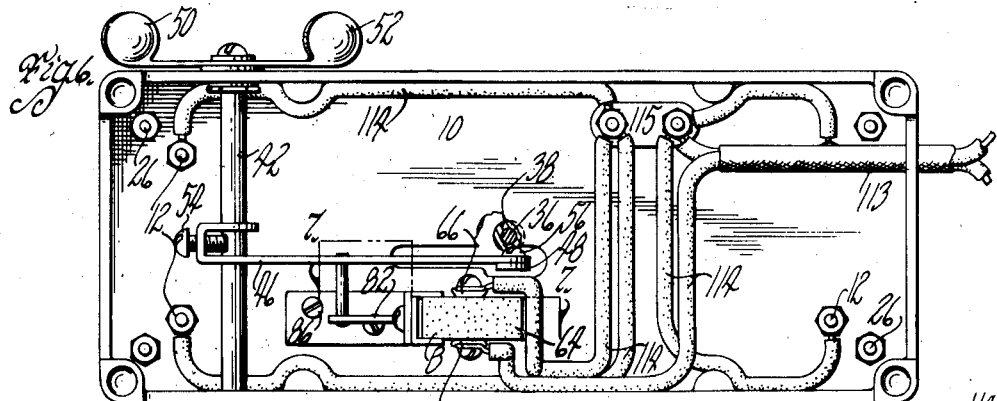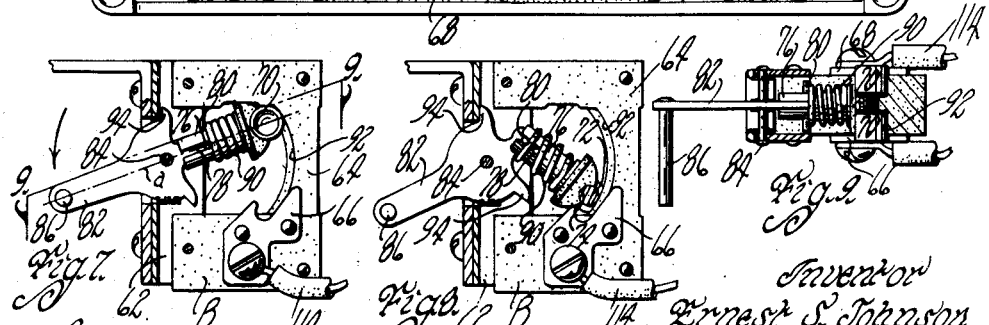

Patented June 19, 1934

1,963,409

UNITED STATES PATENT OFFICE 1,963,409

ELECTRIC TOASTER APPLIANCE

Ernest S. Johnson, Belleville, Ill., assignor to Knapp-Monarch Company, Belleville, Ill., a corporation of Missouri Application October 13, 1931, Serial No. 568,547

6 Claims. (Cl. 53—5)

One object of my present invention is to provide a toaster appliance of simple, durable and inexpensive construction, having novel means for controlling the toaster circuit and the support for the article to be toasted.

More particularly, it is my object to provide in a toaster appliance, a means for clamping the bread or other article being toasted in a predetermined position with respect to the heating element of the toaster when the bread is in heating position and to provide for automatic de-energization of the heating element circuit upon movement of the bread support to exposure position.

Still a further object is to provide an over-center or snap mechanism for maintaining the bread support in either the exposure or heating position and for causing snap action of the circuit switch as well as to maintain the switch in its respective "off" and "on" positions.

A further object is to provide novel means on the bread support for clamping a slice of bread thereon, such means being operable by gravity and arranged to effectively clamp a slice of bread of any desired thickness between certain limits in a position equally spaced between a pair of heating elements.

More particularly, it is my object to provide a rest member with inclined slots having clamping wires extending therethrough and slidable relative thereto and inclined stationary surfaces for the clamping wires to engage with, for moving the clamping wires equally toward each other for clamping a slice of bread between them, whereupon the rest member is supported by the clamping wires when in fully clamped position.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a toaster appliance embodying my invention.

Figure 2 is a slightly enlarged transverse detailed sectional view on the line 2—2 of Figure 1.

Figure 3 is a partial sectional view similar to Figure 2, showing the parts in a different position.

Figure 4 is a sectional view on the line 4—4 of Figure 3.

Figure 5 is a vertical longitudinal sectional view on the line 5—5 of Figure 1.

Figure 6 is a bottom plan view of the toaster appliance.

Figure 7 is a side elevation of the heating element switch, showing the parts in a different position than the position shown in Figure 5.

Figure 8 is a view similar to Figure 7 showing the parts in still a different positon; and Figure 9 is a sectional view on the line 9—9 of Figure 7.

On the accompanying drawings, I have used the reference numeral 10 to indicate a base, which is preferably of insulating material. Heating element terminal screws 12 extend through the base 10 and support heating element brackets 14 of rectangular pan-like construction from which they are insulated.

Hooks 16 are mounted in the tops and bottoms of the heating element brackets 14 and insulated therefrom. Coiled heating elements 18 are wound in zigzag formation over the hooks 16, as best shown in Figures 2 and 5 of the drawings. A rectangular tubular casing 20 surrounds the heating element brackets 14 and is positioned relative to the base 10 by means of bosses 22 formed thereon adjacent the corners thereof. A cover 24 is provided for the casing 20 and is retained in position by tie rods 26 extending through the cover and the bosses 22 of the base 10. The cover 24 is provided with bread receiving slots 28.

Within the casing 20 I provide an article support A for bread or the like comprising a bottom or rest member 30 and end members 32. The end members 32, as shown in Figures 2, 3 and 4, are vertically slidable between the end members of the pan-like heating element brackets 14. As an additional guiding means, a hub 34 is formed at the center of the rest member 30 and is slidable relative to a rod 36. The rod 36 is supported at its lower end in a boss 38 of the base 10 and at its upper end by a screw 40 extending through the cover 24.

Means is provided for manually and vertically moving the article support A consisting of a rock shaft 42, levers 44 and 46 and a link 48. The lever 44 has finger engaging pads 50 and 52 on the outside of the base 10, as shown in Figure 1. The lever 46 is connected with the rock shaft 42 by a set screw 54, as shown in Figure 5 and is pivoted, as at 56, to the link 48. The link 48 is pivoted at 58 to a lug 60 extending downwardly from the rest member 30.

It is desirable to constrain the article support A to remain in either its upper (or exposure) position or its lower (or heating) position when moved to such positions.

It is also desirable to provide a switch for the heating elements which is in "on" position when the article support is in heating position and in "off" position when the article support is in exposure position. I have, therefore, provided a snap acting switch having overcenter spring means for accomplishing the double purpose of constraining both the switch and the article support to remain in their opposite positions after being manually moved to such positions and have operably connected the heating element switch and the manually movable article support A together, as will now be described.

I have shown a switch B comprising a bracket 62 having a frame 64 of insulating material, on opposite sides of which are mounted contacts 66 and 68. A bridging contact is provided for the contacts 66 and 68 in the form of rollers 70 connected by a shaft 72. The shaft 72 is rotatable relative to a notch 74 formed in a link 76. The link 76 has a slot 78 coacting with a pin 80. The pin 80 is carried by a switch lever 82 pivoted at 84 to the bracket 62.

The switch B is in "off" position in Figure 5 and upon movement toward "on" position because of a pin and slot connection 86 and 88 with the lever 46, the parts will first assume the position shown in Figure 7, with the pins 84 and 88 and the shaft 72 in substantial alignment, whereafter further movement will cause assumption of an overcenter position. A spring 90 on the link 76 will then expand (it being fully contracted in Figure 7) for causing the rollers 70 to travel along a curved track 92 of the member 64 and finally engage and bridge the contacts 66 and 68, as shown in Figure 8.

Stops 94 are provided on the switch lever 82 to limit the movement of the switch to its respective "off" and "on" positions.

From the construction of the parts just described, it will be obvious that the overcenter spring 90, besides causing snap action of the switch B, causes snap action of the article support A and constrains both the switch and the support to remain in either opposite position to which they are manually moved.

On the article support A, I provide clamping means for the slice of bread indicated at C, in the form of upper and lower clamping wires 96 and 98. The wires 96 and 98 are slidable in inclined slots 100 of the end members 32, as shown in Figures 2 and 3. In the upper position shown in Figure 2, they slide or roll by gravity to the lower ends of the inclined slots 100. In this position, they are widely separated, so that a slice of bread C may be inserted through the slot 26 of the cover 24 and rest on the rest member 30.

Upon movement of the article support A toward its lowermost position, the clamping wires 96 and 98 engage inclined cam surfaces and cam flanges 102 and 104, respectively, of cam brackets 106. The cam brackets 106 have ears 108, riveted, as at 110, to the ends of the pan-like heating element brackets 14 and are thus stationarily mounted. Spacers 111 are riveted to the cam brackets 106 for engaging the casing 20.

It will be obvious that upon the slice of bread C being fully clamped, the spring 90 and the weight of the parts A, C, 46 and 48 will be imposed on the clamping wires 96 and 98, thus causing effective rigid clamping of the slice of bread C in an exactly central position between the pair of heating elements 18. This entirely eliminates any possibility for the bread to tip toward one heating element and away from the other and thus cause unequal toasting of the bread. Such an advantage, of course, is quite desirable inasmuch as in applicant's construction, each entire surface of the bread C is equally spaced from a heating element and thereby evenly toasted throughout the surface.

I have shown a connector plug 107 and a supply wire 113 extending through an opening 112 in the end of the base 10 to the control switch C and a terminal block 115. From the terminal block 115, wires 114 extend to the heating element terminals 12.

Although I have shown the spring 90 of the switch B for the purpose of constraining the article support to remain in its two positions, another spring for this one purpose could be provided independent of the switch, if found desirable.

Other changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an appliance of the character described, a heating element, means for supporting an article thereadjacent comprising a rest member, means for moving said rest member to exposure and heating positions and means for causing clamping of an article on said rest member a predetermined distance from said heating element when the article support is in heating position, said last means comprising a clamp member movable toward the article and inclined cams engageable with said clamp member for so moving it when the weight of said rest member is imposed on said clamp member and said cams, said rest member being supported by the clamp member and the cams upon the article being fully clamped.

2. In an appliance of the character described, a pair of heating elements, a vertically movable article support therebetween and means for clamping an article on said support when the support is in its lower limit of movement, said means comprising an article engaging member movable at an angle relative to and mounted on said article support and a stationary cam with which said article engaging member is engageable for moving said article engaging member relative to said article support and said cam in a substantially horizontal direction.

3. In an appliance of the character described, a pair of heating elements, a vertically movable article support therebetween having slanting surfaces and means for clamping an article on said support when the support is in its lower limit of movement, said means comprising an article engaging member movable along said surfaces relative to said article support and carried thereby, and an inclined member with which the article engaging member engages and relative to which it slides for moving the article engaging member relative to said article support upon vertical movement of the article support.

4. In a device of the class described, a vertically movable article support having an inclined slot, clamp means extending through and slidable in said slot and an inclined member for said clamp means to engage with to slide it relative to said slot to clamping position upon movement of the article support to a predetermined position.

5. In a device of the class described, a vertically movable article support having an inclined slot, clamp means extending through and slidable relative to said slot and normally assuming a nonclamping position adjacent the lower end thereof and a member for said clamp means to engage with to slide it relative to said slot to clamping position upon movement of the article support to a predetermined position.

6. In an appliance of the character described, a heating element, a vertically movable article carrier thereadjacent, means on said article carrier to engage one side of an article, means between the article and the heating element to engage the other side thereof, said last means comprising a clamp member, said article carrier having inclined slots through which said clamp member extends, and stationary inclined elements, the inclination thereof being opposite the inclination of said slots, said clamp member engaging said inclined elements whereby movement of the article carrier to operative position causes the inclined elements to move said clamp member relative to said inclined slots and toward said article.

ERNEST S. JOHNSON.